Feb. 27, 1934.  E. KRAMAR  1,949,256
RADIO DIRECTION FINDER
Filed June 20, 1931  4 Sheets-Sheet 1
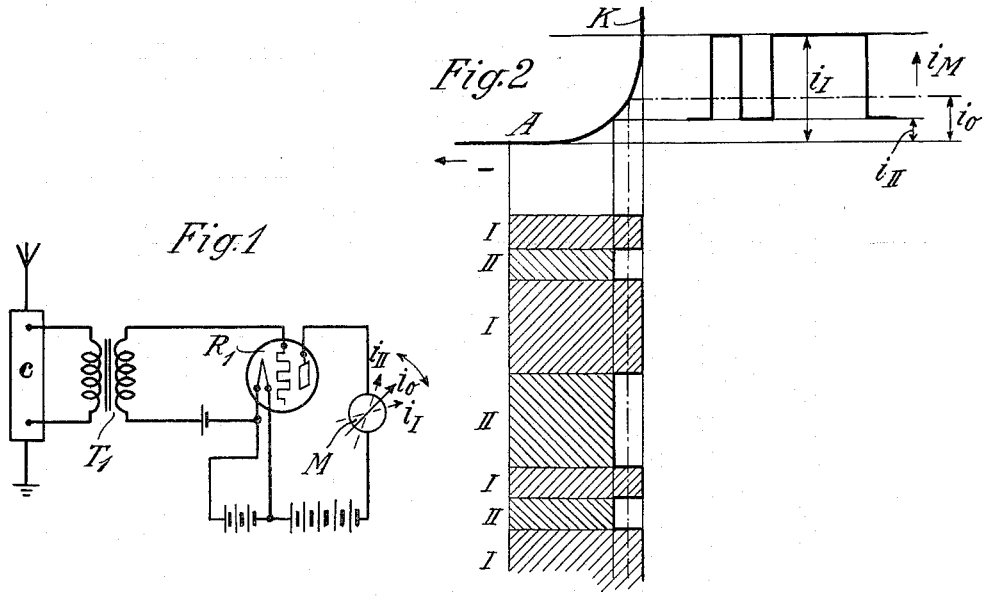
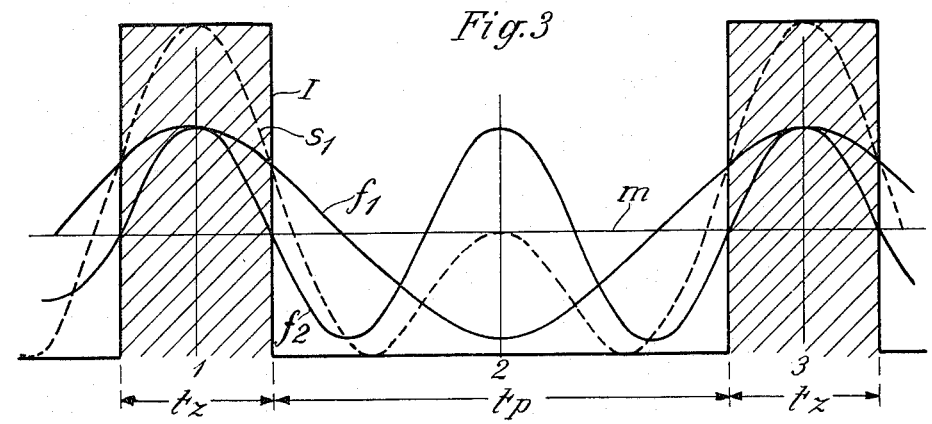
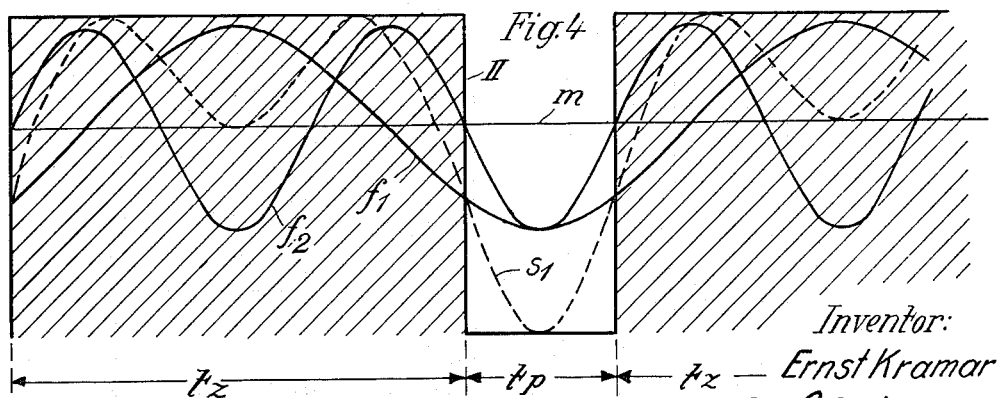
Inventor:
Ernst Kramar
by R. C. Hopgood
Attorney Feb. 27, 1934.  E. KRAMAR  1,949,256
RADIO DIRECTION FINDER
Filed June 20, 1931  4 Sheets-Sheet 2

Inventor:
Ernst Kramar
by R. C. Hopgood
Attorney

Feb. 27, 1934.  E. KRAMAR  1,949,256
RADIO DIRECTION FINDER
Filed June 20, 1931  4 Sheets-Sheet 3

Inventor:
Ernst Kramar
by R.C. Hopgood
Attorney

Feb. 27, 1934.   E. KRAMAR   1,949,256
RADIO DIRECTION FINDER
Filed June 20, 1931   4 Sheets-Sheet 4

Inventor:
Ernst Kramar
by R. C. Hopgood
Attorney

Patented Feb. 27, 1934

1,949,256

UNITED STATES PATENT OFFICE 1,949,256

RADIO DIRECTION FINDER

Ernst Kramar, Berlin-Tempelhof, Germany, assignor to C. Lorenz Aktiengesellschaft, Berlin-Tempelhof, Germany, a company Application June 20, 1931, Serial No. 545,730
In Germany June 23, 1930

16 Claims. (Cl. 250—11)

This invention relates to radio systems adapted to enable an aircraft, vessel or other means of transportation to receive an indication of the most desirable route to be followed.

More particularly, the invention relates to systems of this kind in which radio-signals are transmitted from a known point, having a radio beacon, in two different directions, the craft or the like moving within the angle between these directions. Such a beacon usually has two directive antennas or directive antennæ systems and is adapted to send a predetermined signal in either direction. For example, it may send the letter *a* in one direction, i. e. a dot and a dash, while it may send the letter *n* in the other direction, i. e. a dash and a dot. This *a—n* method is one that has hitherto been used in practice. These two signals are received with equal strength in a zone between these directions, in which zone they form a continuous dash. This zone includes the course to be followed. If the craft remains on this course, then a continuous dash is reproduced in the receiving apparatus on the craft. The recordation of these signals has been accomplished hitherto by acoustic means. Whenever the craft happens to be off the most desirable course, then either the letter *a* or the letter *n* is reproduced more intensively so as to indicate that the craft is on the left- or right-hand side of this course.

The invention described hereinafter has for its object to indicate on a dial the location of the craft with respect to the most desirable course, as well as the extent of the craft's deviation from that course.

In one adaptation of the invention, a letter or character combination of dots and dashes is not transmitted in either direction, but instead a special non-composed sign only is transmitted in each direction, i. e. either a dot or a dash or some other signal element. Both signals are transmitted on the same frequency or frequencies.

The simplest case is that in which one of the systems of directional aerials is transmitting dashes only, while the other is transmitting dots only. Owing to the fact that on one side of the course most desirable for the craft to follow dots only are indicated to the pilot, he does not have to discriminate between such signals as are each composed of dots and dashes and hence which may be mistaken one for the other. This may occur by an optical illusion in that the operation of the pointer of the indicating device may falsely affect the eyes of the pilot, in the *a—n* method.

In the case of the apparatus described below, in the zone which contains the most desirable route to be followed by the craft, dot signals completely fill the intervals between the received dash signals.

In the drawings, several embodiments of receivers, adapted for use with this novel method, are diagrammatically illustrated by way of example. In these drawings:

Fig. 1 shows the circuit arrangement of one embodiment;

Figs. 2, 3, 4 are diagrams which refer to the mode of action of this arrangement and of the one represented in Figs. 5, 5*a* and 6;

Figure 5:
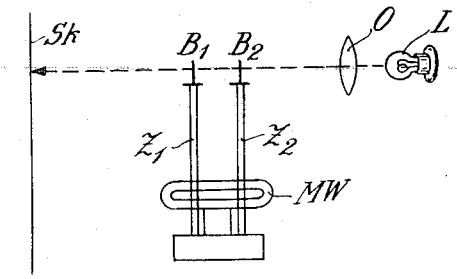
Figure 5A:
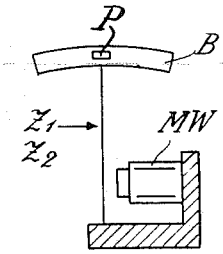
Figure 6:
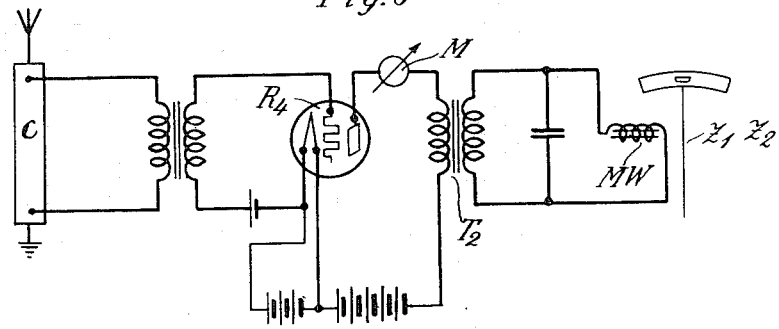
Figure 7:
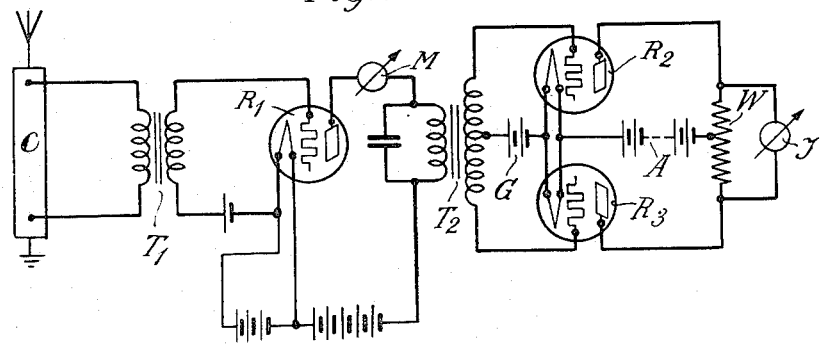
Figure 8:
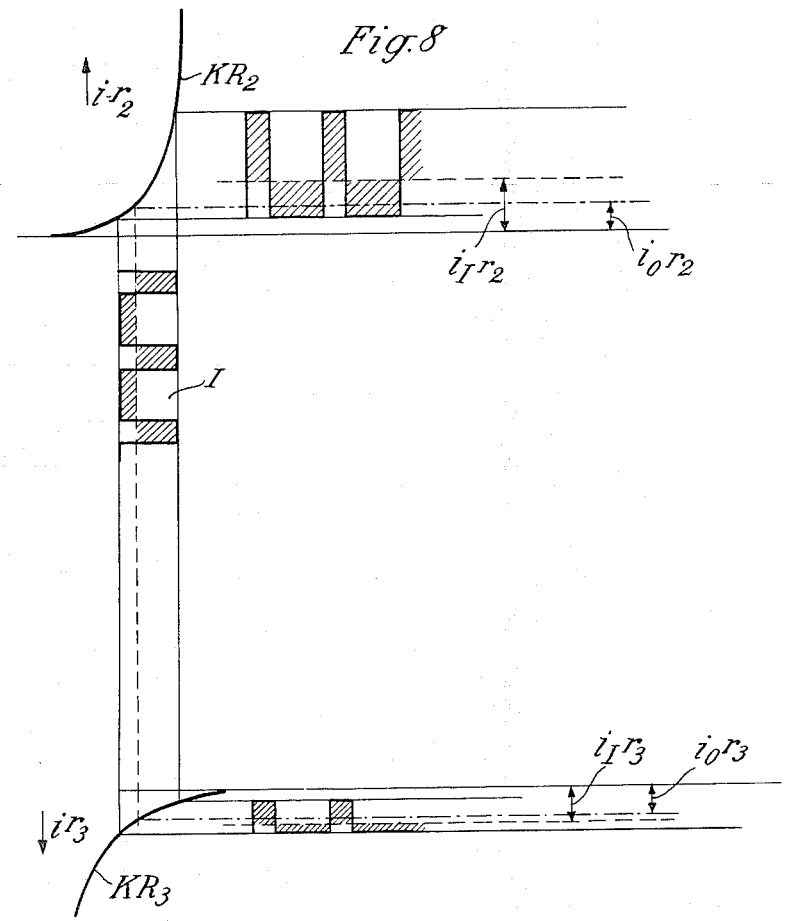
Figure 9:
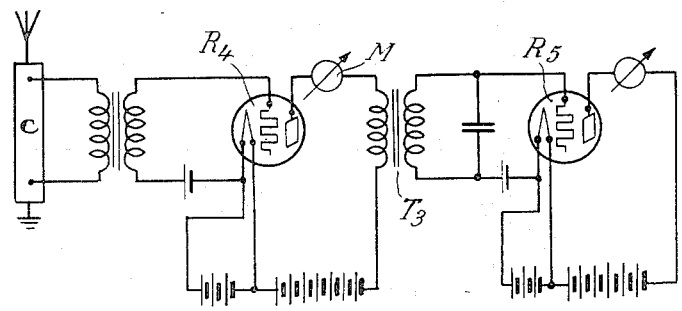
Figure 10:
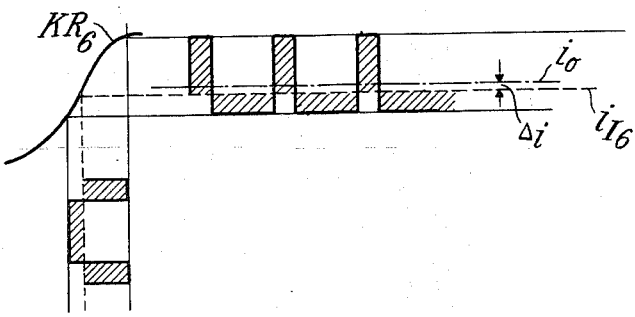
Figure 11:
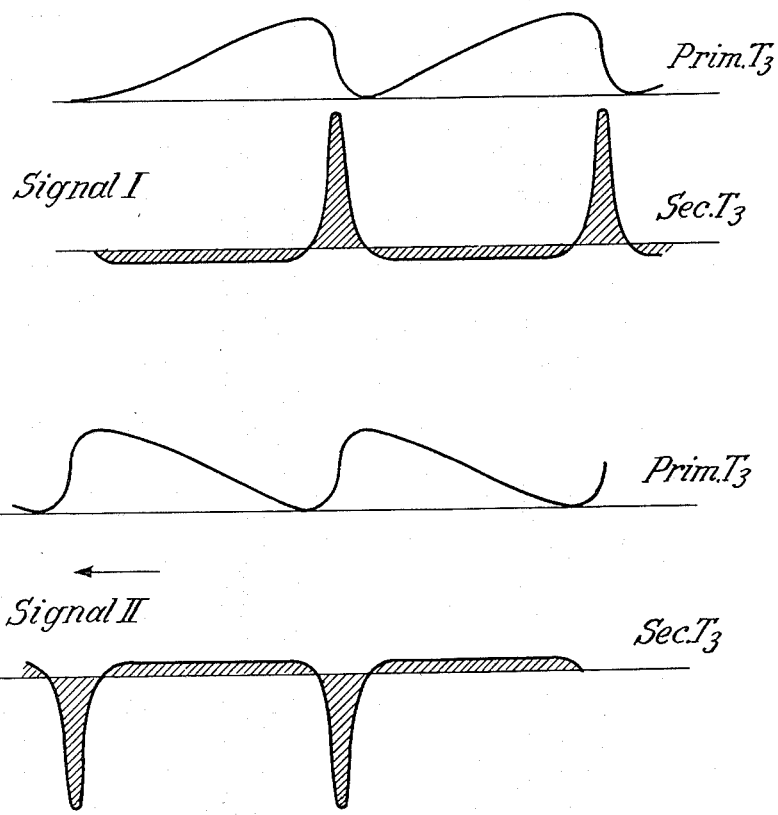

Figs. 5, 5*a* and 6 diagrammatically show a second arrangement of apparatus embodying the invention, Fig. 5*a* being a side elevation of Fig. 5 while Fig. 6 illustrates a circuit arrangement adapted to be used in conjunction with the device represented in Figs. 5 and 5*a*;

Fig. 7 shows the circuit arrangement of a third example;

Fig. 8 is a diagram showing the mode of action of this third example;

Fig. 9 shows the circuit arrangement of a fourth example;

Fig. 10 is a diagram that refers to the mode of action of this fourth example; and Fig. 11 is a diagram illustrating a mode of operation of the transmitting apparatus.

In the arrangement according to Fig. 1, the signals intercepted by a suitable receiving device C are conducted over a transformer $T_1$ to the grid circuit of an electron tube rectifier $R_1$ in the anode circuit of which an indicating device M is disposed.

In Fig. 2, K is a portion of the characteristic curve of the rectifier $R_1$. This characteristic is taken from the lower knee of the characteristic or quadratic curve so that very small differences in the intensities of the arriving or input signals produce large differences in the output of the tube. As will be seen from Fig. 2, the point A of operation of the tube $R_1$ is displaced far in the negative direction. In the event of the strengths of the two transmitters being equal to each other, the device M shows a small permanent deflection $i_0$ in the line of symmetry. The pointer of the device M will move from one to the other side of this position as the two signal strengths change relative to one another. This enables one to read off the stronger signal, provided that the keying at the two transmitters is timed in accordance with the periodicity of the instrument M.

It may be noted here that this device is not only adapted for use with the novel method before described, but may also be employed if, in either of the said directions of radiation, combinations of dashes and dots are transmitted such, for example, as the signals $a$, $n$.

It is thus assumed in Fig. 2 that $a$ and $n$ are transmitted and that the signal of transmitter I is prevailing over that of transmitter II. The difference of amplitudes of the signals of I and II, which is but small, is greatly magnified as shown by the quadratic characteristic curve K. The pointer of the measuring device M is deflected more or less to the right or the left of its line of symmetry $i_0$ under the influence of the currents $i_I$ and $i_{II}$ the former being positive and the latter, say negative, with respect to $i_0$, and both therefore differ from the current $i_0$. If the keying operation at the transmitter is slow enough and the device M not too sluggish in response then the deflection of the pointer exactly corresponds with the amplitudes of the transmitted energy or with the deviation of the receiving craft from the line of symmetry with respect to the two principal directions of the transmitter radiations. Research by means of Fourier's theory shows that an aproximation to dot signals separated by appropriate intervals can be produced by combining an oscillation of one frequency with a second oscillation, the frequency of which is double that of the first. The intervals are then about three or four times as long in duration as the signals.

Thus, in Fig. 3 a dot signal is represented by hatched rectangles. $m$ denotes the line of mean values. The signal lasts a period $t_z$ which is one-third of the interval $t_p$. The dotted curve $s_1$ represents an oscillation composed of the frequencies $f_1$ and $f_2$. The frequency $f_2$ is double the frequency $f_1$. The representation shows that the curve $s_1$ is approximately like the signal I. The small differences from the rectangular shape may be disregarded for practical purposes. They are attributable to the higher harmonics which have not been taken into consideration.

In order to pass on from the dot signals shown in Fig. 3 to dash signals it is not necessary to use frequencies other than $f_1$ and $f_2$. All that is necessary is, to dephase the frequency $f_2$ by 180°. Then the dash signal II is approximately obtained, as illustrated in Fig. 4. The frequencies are here denoted by the same reference characters as in Fig. 3 and represented in a manner similar to that of Figure 3. Theoretical researches furthermore disclose that it is necessary to avoid any dephasing other than that described, for then a curve will result that does not correspond to the desired signals. Another and perhaps more enlightening way of looking at these signals is to consider the signal I in Fig. 3 as a positive dot signal and the signal transmitted, as in Fig. 4, as a negative dot signal. Each transmitter may then be considered as transmitting dots.

If the signals are produced in this way then the receivers described hereafter may be used.

In Fig. 5, $Sk$ denotes a section through the frosted glass plate of an indicating device. Behind this scale plate there are a source of light L and an optical arrangement, represented by a lens O. The rays from the source of light are concentrated by the arrangement O and projected onto the plate $Sk$. Two diaphragms $B_1$ $B_2$ each having an opening P and both being disposed in the path of the light rays, are seated on two reeds $Z_1$, $Z_2$. These reeds are acted upon electromagnetically by a device MW and are tuned to the frequencies $f_1$, $f_2$ the signification of which has been explained with reference to Figs. 3 and 4. The reeds thus vibrate at different frequencies, that is with different velocities. The light can only strike the plate $Sk$ if the diaphragms $B_1$, $B_2$ coincide with each other. Such is the case whenever the frequencies $f_1$, $f_2$ (Figs. 3, 4) are at the same point, such as at the time 1 indicated in Fig. 3. From this point the two movements, it is true, are in the same direction but proceed at different speeds. At the time 2 the diaphragms $B_1$, $B_2$ are most remote from one another, $f_1$ being negative, $f_2$ positive. They then again approach each other in order to come into register at the time 3 which corresponds to the time 1. The flashing of a signal on plate $Sk$ thus depends upon the relative positions of the diaphragms. The extent of the deflection thereon indicated depends on the amplitudes of the frequencies $f_1$, $f_2$, these amplitudes in turn depending upon the deviation of the receiving craft from the line of symmetry of signals received from the transmitter radiations. The reeds are permanently magnetized in order that the vibrations thereof shall take place in accordance with the exciting alternating currents. In this way the previous magnetization tends to secure a mean position of the reeds, so that in the case of a preponderance of the positive half-wave of the exciting frequencies the movement of the reeds and consequently of the beam of light on $Sk$ is excessive in one direction, while in the case of a preponderance of the negative half-wave it is excessive in the other direction.

As shown in Fig. 6, the magnetizing coil of the device MW is connected in series with the secondary of a transformer $T_2$. The primary thereof and the measuring instrument M are connected in series in the anode circuit of an electron tube $R_4$.

The decomposition of signals which has been proposed by Fourier, as stated before, admits of still another mode of indicating the prevailing signal. This mode consists in transforming the harmonics $f_1$, $f_2$, of which the continuous current dot and dash (negative dot) signals are composed, by means of a transformer without varying the magnitude and phase of these harmonics. The transformer itself does not permit of transforming the continuous current signals as such. According to whether dot or dash keying is predominating, at the secondary side of the transformer, the amplitude of signals from the tube $R_2$ or, say, the positive amplitude will be greater than the negative one, or vice versa, as shown in Figs. 3 and 4, respectively. These differences of amplitudes can be utilized by the arrangement shown in Fig. 7.

In this arrangement (Fig. 7) the signals received are conducted through a transformer $T_1$ to the grid of the rectifier tube $R_1$, as described with reference to Fig. 1. In the anode circuit of this tube the primary coil of a second transformer $T_2$ is inserted. The secondary coil thereof is connected at its ends with the grids of two electron tubes $R_2$, $R_3$. The middle of this secondary coil is attached over a battery G to the filaments of the tubes $R_2$, $R_3$. These tubes are arranged in push-pull connection. In the anode circuit of the tubes a resistance W is provided which at its middle is connected to the anode battery A. The indicating device J and the resistance W are arranged in parallel.

The mode of action of the tubes $R_2$, $R_3$ will appear from Fig. 8. The characteristic curves thereof are denoted by $KR_2$ and $KR_3$ respectively. It is assumed that only signal I of one transmitter i. e. only dot signals are received. The same figure applies when the positive dot signals are more intense than the negative dot signals, e. g. when the craft is off its course on the positive dot transmitter side. The two push-pull tubes operate in the quadratic or lower knee portion of their characteristic curves. The grid potential curve I the mean value of which is shown by dotted lines causes anode currents of different value to flow in both tubes. The signal represented results in an anode current $i_{Ir2}$ in the tube $R_2$. This current is considerably more effective than the current $i_{or2}$ shown in dot and dash lines, the latter current being present if the receiver is located in the line of symmetry of the main directions of the radiation from the transmitters. The anode current $i_{Ir3}$ resulting in the tube $R_3$ is but slightly more effective than $i_{or3}$ which latter is present when the receiver is located on the line of symmetry. The mean values $i_{Ir2}$ and $i_{Ir3}$ of the two anode currents are consequently different. Their difference deflects the pointer of the indicating device J, say, to the right.

On the reception of dash signals only, for example, negative dot signals or upon the negative dot signals becoming more intense than the positive dot signals, the contrary takes place. There is then a more effective current in the anode circuit of the tube $R_3$ than in the tube $R_2$. The anode currents originated by the dot and dash signals are added together so that an unvariable pointer deflection of the device J is obtained. The extent of such deflection depends upon the deviation of the receiving craft from the line of symmetry of the two main directions of the radiation from the transmitters.

On an airplane or other body, fitted with such receiver, approaching the transmitter, the amplitudes of the received currents are increased in consequence of an increase of the field strength. Hence also the aggregate value of current in the device M of the rectifier tube $R_1$ will become greater. The greater the distance of the moving body from the transmitter the greater is the diminution of the pointer deflections of the device J. It is desirable to provide the device M with a graduated scale which indicates approximately the current strength and consequently the distance to the transmitter along the line of symmetry from the station having the two main directions of radiation. To such end the measuring instrument M is disposed in the anode circuit of the tube $R_1$. The input circuits of this tube or any attenuating resistances or the like are so adjusted that the pointer deflection of the device M shall be always the same when the receiver is approaching the transmitter. Thus, on such approach energy is dissipated and the input energy for the rectifier tube $R_1$ maintained at a constant value independently of the distance of the receiver from the transmitter. In this adaptation the indicating device J may be calibrated in say, degrees. It is then necessary on the approach of the receiver to readjust the attenuating resistances or the like, and the exact deviation may be read off immediately.

The arrangement shown in Fig. 9 is simpler than the one represented in Fig. 7. The received rectified signals are led to one tube $R_5$ only which operates with a characteristic curve having a double flexure. The mode of operation of this tube is evident from Fig. 10. The tube is either constructed to operate with the said characteristic, or is of the usual construction, such characteristic being obtained by underheating the tube.

With the mode of operation illustrated in Fig. 10 it is assumed that only dot signals are led to the grid circuit of the tube $R_5$ (Fig. 9). The same figure applies when the positive dot signals are more intense than the negative dot signals, e. g. when the craft is off its course on the positive dot transmitter side. From the special characteristic $KR_6$ there results an anode current $i_{16}$ which differs from $i_0$ by $\Delta i$.

The following is to be noted with respect to Fig. 11.

It has been proposed to key two systems of directional aerials by means of keying chokes, the principal directions of radiation of these systems being at an angle to each other. The two keying coils of the chokes are arranged in series. One of the chokes however, has mounted thereon a magnetizing coil which is energized during the operation of the systems. By closing the keying device one of the chokes is magnetized while the other which has the permanently energized coil is demagnetized, because in this particular choke coil the magnetizing effects of the two coils cancel each other. Owing to this mode of keying, the two transmitted signals are like an object and its image produced by a mirror.

If now in accordance with another feature of the invention one of the signals is made to have a slow increase of current but a quick decrease thereof (which is preferably obtained by controlling the cutting in and out of the signals with the aid of filters) (see Fig. 11, signal I) the other signal is made to have the reverse characteristic. With this signal the cutting in takes place quickly and the cutting out slowly. The signals thus are of a contrary appearance, although comprised of the same frequencies, and resemble one another like an object and its image as produced by a mirror. The signals intercepted by the receiver are denoted by Prim. $T_3$, as they are led to the transformer $T_3$ shown in Fig. 9.

In order that the signals may be used for the operation of the position indicating instruments the receiver must be constructed so as to respond to the switching operations only. To such end a transformer is preferably employed. This may take the form of the transformer $T_3$, Fig. 9. The circuit arrangement is essentially the same as the one above described which uses one tube having a characteristic curve with a double flexure. The oscillations received are led to the transformer connected in the anode circuit of tube $R_4$. The currents resulting from the switching operations only are transferred to the secondary side of the transformer $T_3$ as shown by the peaks of the curve Sec. $T_3$. If the field strengths of both aerials are equal at the place of reception then the continuous current component in the device M does not change and therefore there will be no variation of the potential on the grid of the tube $R_5$. On a dot or dash (negative dot) signal prevailing, the switching operations cause a change of potential at the secondary side of the transformer. This results in a current pulse in one direction, that is stronger or weaker than normal according to whether the operation is less intense for a cutting in (positive dot) signal or a cutting out (negative dot) signal. Since in this case the tube $R_5$ operates with a characteristic curve having a double flexure the anode current thereof will, as stated before, fluctuate in accordance with the deviation of the receiver from the line of symmetry of the main directions of radiation.

What is claimed is:

1. In a radio direction finder, the combination of means for transmitting signals in each of two directions, said signals for each direction having the same frequencies, one frequency of signals transmitted in one direction having its phase shifted a predetermined amount with respect to the corresponding frequency of signals transmitted in the other, means for receiving said signals, means for rectifying the received signals, means for combining with each other the mean values of received signals transmitted in one of said directions with those transmitted in the other, and means responsive to the combined signals for indicating the intensity of signals transmitted in each of said directions.

2. In a radio direction finder, the combination of means for transmitting signals in each of two directions, said signals having the same fundamental and harmonic frequencies, one harmonic frequency of signals transmitted in one direction having its phase shifted a predetermined amount with respect to the corresponding harmonic frequency of signals transmitted in the other, means for receiving said signals, means for rectifying the received signals, means for combining with each other the mean values of received signals transmitted in one of said directions with those transmitted in the other, and means responsive to the combined signals for indicating the intensity of signals transmitted in each of said directions.

3. In a radio direction finder, the combination of means for transmitting signals in each of two directions, said signals having the same fundamental frequency and first harmonic of said fundamental frequency, the harmonic frequency of signals transmitted in one direction having its phase shifted 180° with respect to the harmonic frequency of signals transmitted in the other, means for receiving said signals, means for rectifying the received signals, means for combining with each other the mean values of received signals transmitted in one of said directions with those transmitted in the other, and means responsive to the combined signals for indicating the intensity of signals transmitted in each of said directions.

4. The method of direction finding which comprises transmitting in each of two directions signals with the same frequencies and resembling each other like an object and its image produced by a mirror, receiving said signals, rectifying the received signals, and combining with each other the mean values of the rectified signals.

5. In a radio direction finder, the combination of means for receiving signals transmitted in each of two directions, said signals having the same frequencies in each of said directions, one frequency of signals transmitted in one direction having its phase shifted a predetermined amount with respect to the corresponding phase of signals transmitted in the other means for rectifying the received signals, push-pull tubes for intercepting the rectified signals, a resistance inserted in the anode circuit of these tubes, an indicating device arranged in parallel with such resistance, and means connecting the positive pole of the anode battery to the middle of this resistance.

6. In a radio direction finder, the combination of means for receiving signals transmitted in each of two directions, said signals having the same frequencies in each of said directions, one frequency of signals transmitted in one direction having its phase shifted a predetermined amount with respect to the corresponding phase of signals transmitted in the other means for rectifying the received signals, push-pull tubes for intercepting the rectified signals, a measuring device connected to these tubes, and means for maintaining the pointer deflection of this device at a constant value.

7. A radio direction finding system comprising means for transmitting in each of two directions signals having the same frequencies, one frequency of signals transmitted in one direction having its phase shifted a predetermined amount with respect to the corresponding phase of signals transmitted in the other direction, means for receiving the transmitted signals, means for rectifying the received signals, means for amplifying the rectified signals, and an indicating device responsive to the amplified signals for indicating the relative intensities of the received signals transmitted in each of said directions.

8. A radio direction finding system comprising means for transmitting in each of two directions signals having the same frequencies, each signal being composed of a plurality of different frequencies with one frequency of the signals transmitted in one direction having its phase shifted a predetermined amount with respect to the corresponding frequency of the signals transmitted in the other direction, means for receiving the transmitted signals, means for rectifying the received signals, and an indicating device energized by the rectified signals, said device having two reeds each of which is tuned to vibrate at a different one of the frequencies used in transmitting the signals in each of said directions, said reeds being responsive upon the energization of said device for indicating the relative intensities of the signals transmitted in each of said directions.

9. A radio direction finder comprising means for transmitting signals in each of two directions, said signals for each direction having the same frequencies, the phase of one of the frequencies of signals transmitted in one direction being shifted 180° ahead of the phase of the corresponding frequency of signals transmitted in the other direction, means for receiving the transmitted signals, means for rectifying the received signals, means for combining the rectified signals, and means responsive to the combined signals for indicating the relative intensity of the received signals transmitted in each of said directions.

10. A radio direction finder comprising means for transmitting signals in each of two directions, said signals for each direction having the same fundamental and harmonic frequencies, the harmonic frequency of signals transmitted in one direction being 180° out of phase with the corresponding frequency of signals transmitted in the other direction, means for receiving the transmitted signals, means for rectifying the received signals, means for combining the rectified signals, and means responsive to the combined signals for indicating the relative intensity of the received signals transmitted in each of said directions.

11. In a radio direction finder, the combination of means for transmitting signals in each of two directions, the signals transmitted in one direction having the same frequencies but being mirror images of those transmitted in the other, means for receiving the transmitted signals, means for rectifying the received signals, means for combining the rectified signals, and electromagnetic means responsive to the combined signals for indicating the relative intensity of the received signals transmitted in each of said directions.

12. In a radio direction finder, the combination of means for transmitting signals in each of two directions, said signals having the same frequencies but having a rapid growth when transmitted in one direction and a rapid decay when transmitted in the other, means for receiving the transmitted signals, means for rectifying the received signals, means for combining the rectified signals, and electromagnetic means responsive to the combined signals for indicating the relative intensity of the received signals transmitted in each of said directions.

13. A method of direction finding which comprises transmitting signals in each of two directions, said signals being transmitted with the same frequencies in each of said directions, one frequency of signals transmitted in one direction having its phase shifted a predetermined amount with respect to the corresponding frequency of signals transmitted in the other, receiving said signals, and utilizing them to indicate the relative intensity of the signals transmitted in each of said directions.

14. A method of direction finding in accordance with claim 13, characterized in this, that each of the signals transmitted is synthesized from carrier currents composed of a plurality of frequencies.

15. A method of direction finding in accordance with claim 13, characterized in this, that each of the signals transmitted is synthesized from a carrier current having a predetermined frequency and a carrier current having a frequency which is the first harmonic of the predetermined frequency.

16. In a direction finder, the combination of means for transmitting a pair of signals from a ground station, means for receiving said pair of signals, said signals having the same frequencies but different phase relationships among said frequencies and having intensities dependent upon the position of the receiving means with respect to a predetermined course, means for combining the received signals, and means responsive to said combined signals for indicating the position of said receiving means with respect to said predetermined course.

ERNST KRAMAR.